United States Patent
Alawadi et al.

(10) Patent No.: US 6,835,266 B2
(45) Date of Patent: Dec. 28, 2004

(54) SHUTTLE SYSTEM FOR MANUFACTURING VEHICLE HEADLINERS

(75) Inventors: Mohammed Alawadi, Marysville, MI (US); Jonathan Zamora, Royal Oak, MI (US); Bret Comstock, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 509 days.

(21) Appl. No.: 09/921,242

(22) Filed: Aug. 2, 2001

(65) Prior Publication Data

US 2003/0034118 A1 Feb. 20, 2003

(51) Int. Cl.⁷ .......................... B32B 31/20; B29C 45/14
(52) U.S. Cl. ...................... 156/221; 156/152; 156/222; 156/256; 264/259
(58) Field of Search ................................. 156/221, 222, 156/224, 256, 152; 264/259

(56) References Cited

U.S. PATENT DOCUMENTS

| | | | |
|---|---|---|---|
| 3,910,747 A | 10/1975 | Dean et al. | |
| 4,162,885 A | 7/1979 | Asel | |
| 4,459,093 A | 7/1984 | Asano | |
| 5,431,871 A | 7/1995 | Tanaka et al. | |
| 5,464,341 A | 11/1995 | Tachibana et al. | |
| 5,486,256 A * | 1/1996 | Romesberg et al. | 156/251 |
| 5,529,479 A * | 6/1996 | Souders | 425/384 |
| 5,863,370 A | 1/1999 | Munro | |
| 5,863,568 A | 1/1999 | Tomita et al. | |
| 5,874,033 A * | 2/1999 | Meeker | 264/138 |
| 5,895,624 A | 4/1999 | Reece et al. | |
| 5,942,321 A | 8/1999 | Romesberg et al. | |
| 5,976,295 A | 11/1999 | Ang | |
| 6,030,568 A | 2/2000 | Vestergaard | |
| 6,179,602 B1 | 1/2001 | Eakin | |
| 6,364,976 B2 * | 4/2002 | Fletemier et al. | 156/62.2 |
| 6,451,232 B2 * | 9/2002 | Barber et al. | 264/46.4 |
| 2001/0037854 A1 * | 11/2001 | Byma et al. | 156/309.9 |
| 2003/0100232 A1 * | 5/2003 | Kocher et al. | 442/32 |

FOREIGN PATENT DOCUMENTS

| | | | |
|---|---|---|---|
| DE | 2501366 | | 7/1976 |
| EP | 0920975 | | 6/1999 |
| EP | 0 997 265 | * | 5/2000 |
| JP | 61-162308 | | 7/1986 |
| JP | 7-223237 | | 8/1995 |
| JP | 11-77815 | | 3/1999 |
| WO | WO 98/57796 | | 12/1998 |

* cited by examiner

Primary Examiner—Melvin C. Mayes
(74) Attorney, Agent, or Firm—Bill C. Panagos

(57) ABSTRACT

A method of forming a headliner includes overlaying a cover material onto a multi-layer substrate and at least partially separating the cover material from the substrate during the overlaying. The cover material is clamped separately from the substrate. The overlayed cover material and substrate are then transported into a mold. The substrate is unclamped while the cover material remains clamped, and the cover material and substrate are molded together to form the headliner.

10 Claims, 4 Drawing Sheets

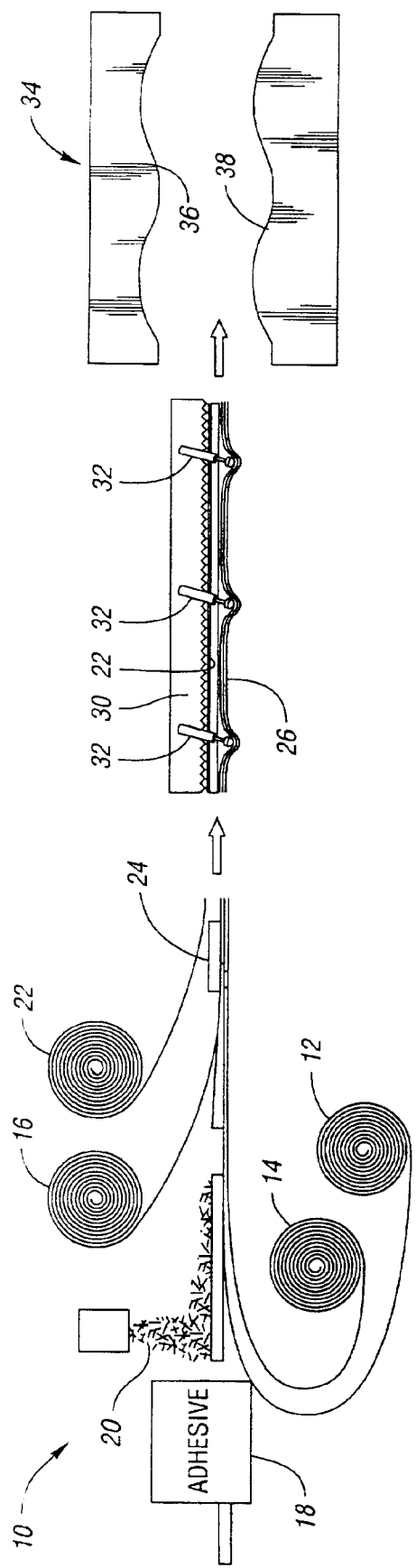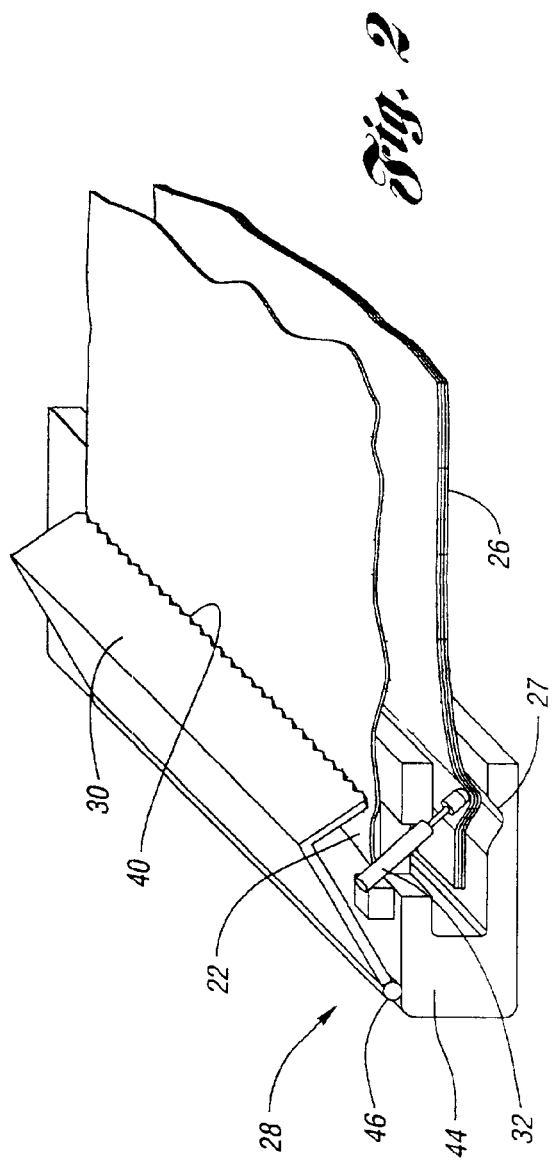

SHUTTLE SYSTEM FOR MANUFACTURING VEHICLE HEADLINERS

BACKGROUND OF THE INVENTION

1. Field of the Invention

The present invention relates to a shuttle system for manufacturing vehicle headliners which includes clamps for separately clamping the cover material from the substrate for improved processing.

2. Background Art

A vehicle headliner typically includes a multi-layer substrate which is covered by a cover material which becomes the "show surface" in the vehicle (i.e., the cover material faces the vehicle interior). Generally, the various substrate materials and cover material are fed from rolls into a conveyor system. The various layers of substrate material are overlayed on each other, and a cover material is positioned thereon. The assembly is then cut to a desired length and transported into a mold. Once the assembly is placed into the mold, the mold is closed and heat is applied to thermoform the various layers together and form the assembly to a desired headliner shape.

Generally, the substrate and cover materials are held together in a taut (tensioned) condition as the mold closes. This is necessary to prevent the formation of wrinkles in the cover material. However, maintaining tension in the substrate may limit moldability of the substrate. Continuous tension in the substrate may result in breaking or "necking down" (thinning) of the substrate in contoured areas of the mold during the molding process.

Accordingly, it is desirable to provide an improved method and apparatus for thermoforming a headliner in a manner which addresses these problems.

SUMMARY OF THE INVENTION

The present invention improves upon the above-described prior art method and apparatus for manufacturing headliners by providing a dual clamping shuttle which clamps a cover material separately from a substrate for shuttling the materials into a mold and releases tension in the substrate prior to releasing tension in the cover material. In this manner, the cover material may remain clamped and in tension to prevent wrinkles while the substrate materials are released prior to mold closure to increase moldability and prevent breaking and necking down of the substrate material.

More specifically, the present invention provides a method of forming a headliner for a vehicle including the steps of:

(a) overlaying a cover material onto a multi-layer substrate;

(b) at least partially separating the cover material from the substrate during the overlaying step;

(c) clamping the cover material;

(d) clamping the substrate separately from the cover material;

(e) transporting the overlayed cover material and substrate into a mold;

(f) unclamping the substrate while the cover material remains clamped; and (g) molding the cover material and substrate together to form the headliner.

Preferably, the cover material is clamped using pivoting jaw clamps, and the substrate is clamped with a plurality of discreet clamping members, such as pneumatically actuated pin members.

Preferably, a separator is provided to separate at least an edge of the cover material from the substrate to facilitate separate clamping of the cover material from the substrate. Also, preferably, the separator includes a movable portion to facilitate cutting of the cover material and substrate.

Another aspect of the invention provides a shuttle assembly for transporting the cover material and substrate into a mold to form a headliner. The shuttle assembly includes at least one movable rail. A first clamping apparatus is operatively connected to the rail for clamping the cover material, and a second clamping apparatus is operatively connected to the rail for clamping the substrate. The first clamping apparatus is unclampable separately from the second clamping apparatus to facilitate unclamping of the substrate prior to unclamping of the cover material when the cover material and substrate are positioned in the mold to minimize stretching of the substrate and to prevent formation of wrinkles in the cover material.

Accordingly, an object of the invention is to provide an improved method and apparatus for manufacturing a headliner which includes a movable shuttle which clamps the substrate separately from the cover material.

Another object of the invention is to provide a method of molding a headliner in which a cover material and substrate are clamped and transported into a mold, and the substrate is unclamped prior to unclamping of the cover material to prevent stretching of the substrate and to prevent wrinkling of the cover material.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a schematic side view of a method of manufacturing a headliner in accordance with the invention;

FIG. 2 shows a schematic perspective view of a shuttle mechanism and clamps in accordance with the present invention;

DETAILED DESCRIPTION OF THE PREFERRED EMBODIMENT(S)

Figure 3:
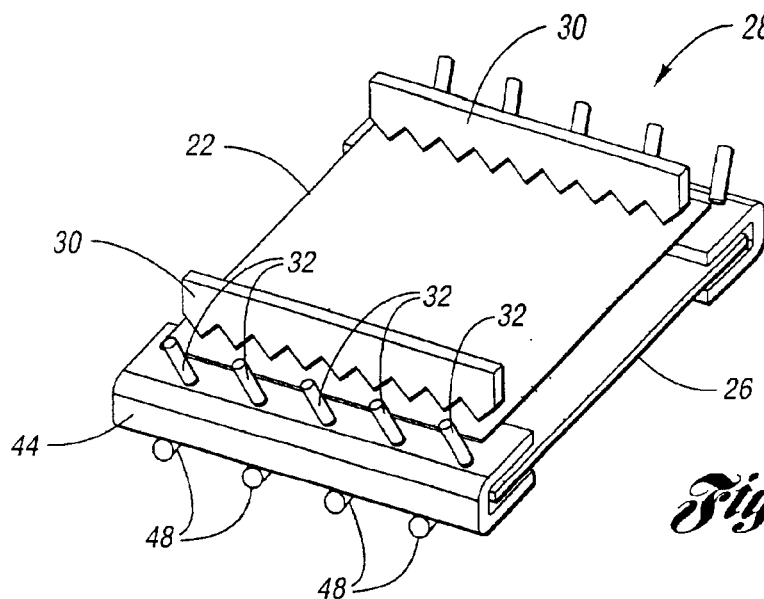
FIG. 3 shows a reverse schematic perspective view of the shuttle assembly of FIG. 2.

FIG. 1 shows a schematic side view of a thermoforming system 10 in accordance with the present invention. In the thermoforming system 10, substrate materials, such as polyester sheets, urethane foam, adhesive films, etc., are provided in rolls 12, 14, 16. Sheets of such materials are fed from the rolls 12, 14, 16 onto a conveyor, and adhesive 18 and glass particles 20 are disposed thereon. The various materials dispensed from the substrate material rolls 12, 14, 16 and the adhesive 18 and glass particles 20 cooperate to form a substrate when such components are overlayed on top of each other. A cover material 22 is also fed from a roll onto the substrate layers.

A material separator 24 is provided to at least partially separate the cover material 22 from the substrate layers so that the cover material 22 and substrate 26 can be clamped and unclamped separately from each other in the movable shuttle 28. The movable shuttle 28 includes upper clamping members 30 for clamping the cover material 22, and lower clamping members 32 for clamping the substrate 26 independently of the cover material 22. The upper and lower clamping members are also referred to as first and second clamping apparatuses in this description.

The movable shuttle 28 is configured to transport the cover material 22 and substrate 26 into the mold 34 between the first and second mold halves 36, 38.

FIG. 2 shows the clamping structure of the movable shuttle 28 in schematic perspective view to illustrate its operation. As shown, the upper clamp 30 comprises a jaw clamp with a plurality of teeth 40 for clamping the cover material 22 against the bar 42. The upper clamp 30 is pivotally connected to the movable rail 44 of the shuttle 28 at the pivot joint 46. The lower clamping member 32 clamps the substrate 26 into the recess 27 of the rail 44.

Figure 4:
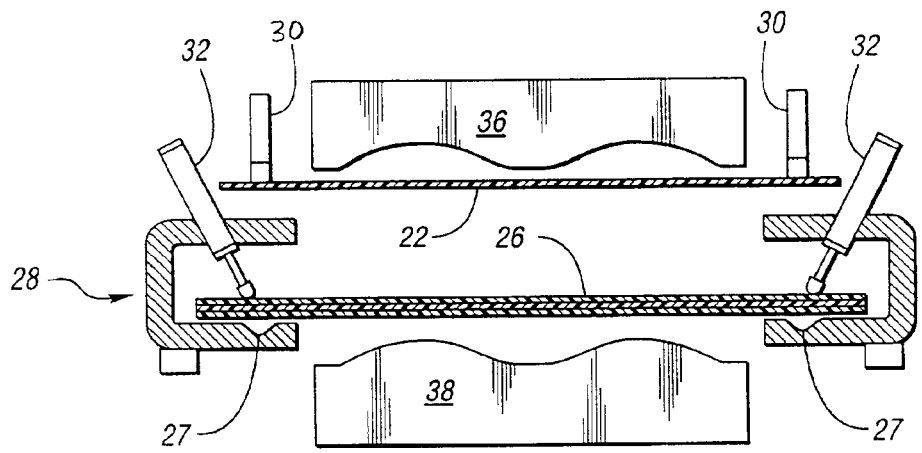
FIG. 4 shows a schematic end view of a substrate and cover material shuttled into a mold with the substrate and cover material clamped in tension.
Figure 5:
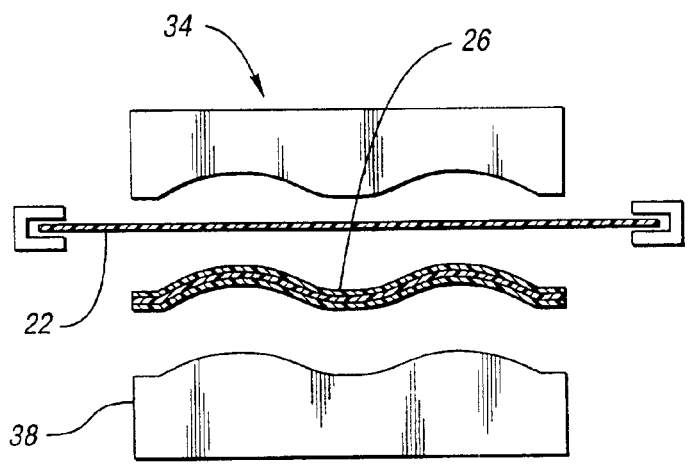
FIG. 5 shows a schematic end view of the cover material and substrate within the mold of FIG. 4 wherein the substrate has been unclamped and the cover material remains in tension.

FIGS. 3–5 provide further schematic illustrations of the movable shuttle 28 and illustrate the sequence of transporting the substrate and cover material into the mold 34. As shown, the movable rails 44 of the shuttle 28 are supported on rollers 48 to facilitate movement of the shuttle 28 with respect to a conveyor (a stationary set of support rails). The upper clamps 30 (shown schematically) hold the cover material 22 separately from the substrate 26, which is held by the lower clamping members 32. The cover material 22 and substrate 26 are held in tension, and the shuttle 28 transports these components into the mold 34 between the mold halves 36, 38, as shown in FIG. 4. The lower clamping members 32 are then released to unclamp the substrate 26, and the substrate 26 is laid on the lower mold 38, while the cover material 22 remains clamped and under tension, as illustrated in FIG. 5. The mold halves are then closed together, and heat and pressure are applied to thermoform the substrate 26 and cover material 22 together to form a headliner. The cover material 22 may be released at an optimal time after the substrate 26 is released. It may be desirable to maintain tension in the cover material 22 until after the mold halves 36, 38 are closed together to prevent formation of any wrinkles on the cover material 22.

Figure 6:
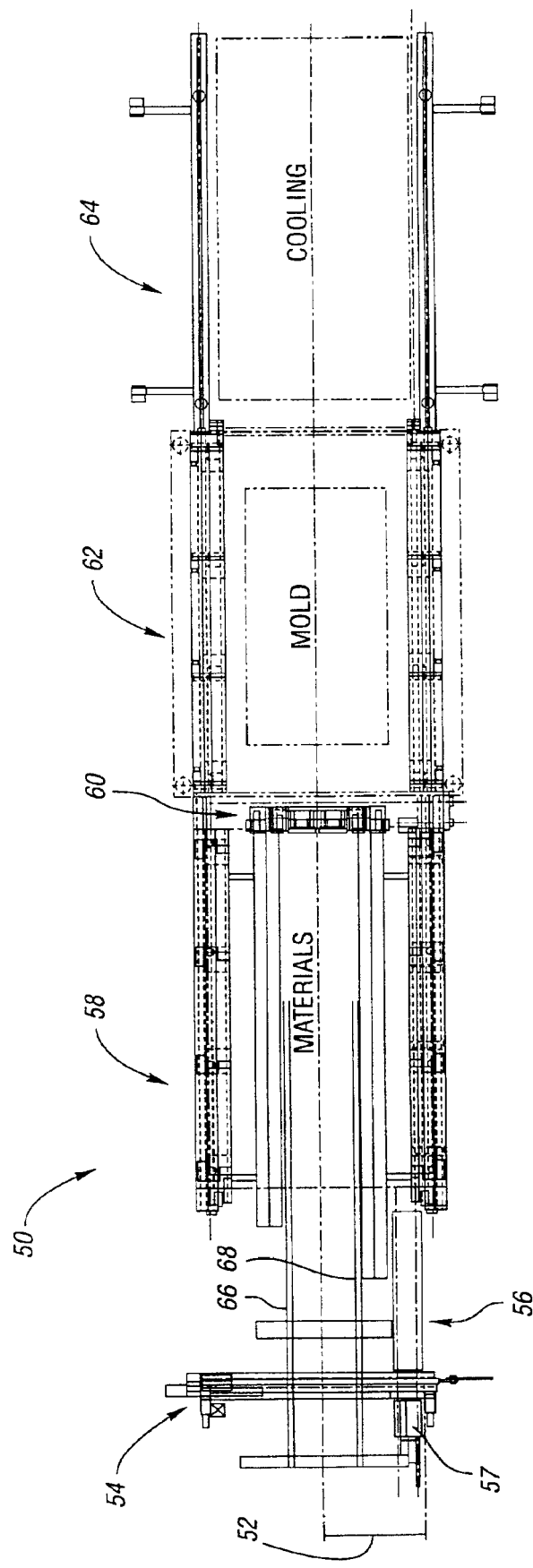
FIG. 6 shows a plan view of a thermoforming system in accordance with the present invention.

Turning to FIG. 6, a thermoforming system 50 is shown in plan view. As described previously with reference to FIG. 1, the cover and substrate materials are fed into a first end 52 of the thermoforming system 50. The thermoforming system 50 includes a cutter 54, a separator 56, a movable shuttle 58, a puller 60, a molding station 62, and a cooling station 64.

The puller 60 is independently movable and travels to the left, as viewed in FIG. 6, to grab and pull a multi-layer stack of cover and substrate materials toward the molding station 62. Accordingly, the puller 60 moves to the left, as viewed in FIG. 6, and grasps the multi-layer assembly of cover and substrate materials. The puller 60 advances this multi-layer assembly from left to right, as viewed in FIG. 6 along the rails (conveyor) 66, 68.

Figure 7:
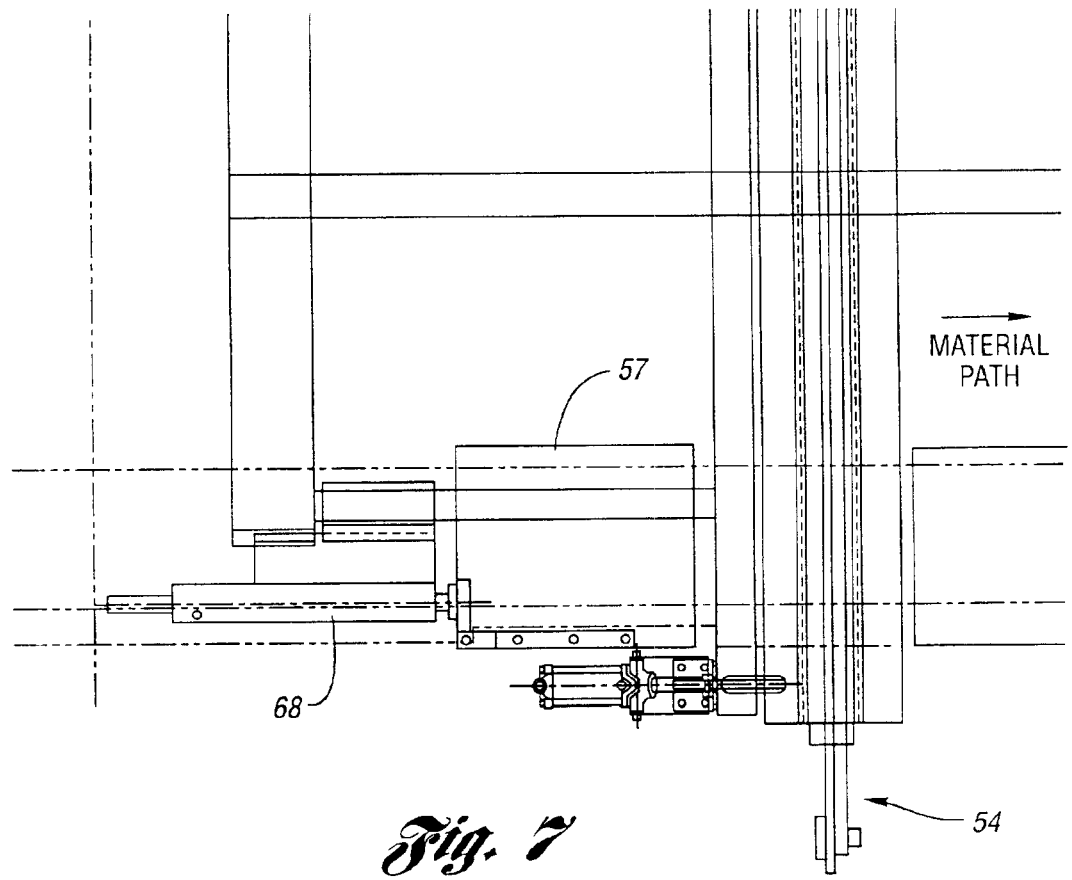
FIG. 7 shows an enlarged plan view of a separator and cover taken from FIG. 6.

Prior to grasping by the puller 60, as the cover material is fed from a cover material roll onto a multi-layer substrate, the separator 56, 57 separates an edge of the cover material from the substrate. The puller 60 then advances the cover and substrate material from left to right to a cutting position. When the substrate and cover material have been advanced to the appropriate position for cutting, the movable portion 57 of the separator 56 is moved from right to left, as viewed in FIGS. 6 and 7 to enable the cutter 54 to cut the substrate and cover material to the desired length to form the headliner. The movable portion 57 of the separator is actuated by an air cylinder 68.

After cutting, the cover material and substrate are advanced further forward by the puller 60 to a position to be clamped by the upper and lower clamps 30, 32 of the movable shuttle 58. As the puller 60 advances the cover material and substrate forward, the separator 56 maintains separation of an edge of the cover material from the substrate. As shown, the separator 56 (which includes movable portion 57) is merely a thin metal sheet or ramp which is operative to separate an edge of the cover material from the substrate. A similar separator 56 would be provided on the opposite side to separate the opposing edge of the cover material from the substrate. As the cover material is laid onto the substrate, the edges of the cover material immediately contact the separator 56 (the cover material is layed on top of the separator and the substrate is below the separator), which establishes and maintains such separation between the edges of the cover material and the substrate.

This separation of the edges of the cover material from the substrate enables separate clamping of the substrate and the cover material to enable release of tension in the substrate and cover material at different times, as described previously with reference to FIGS. 1–5.

Figure 8:
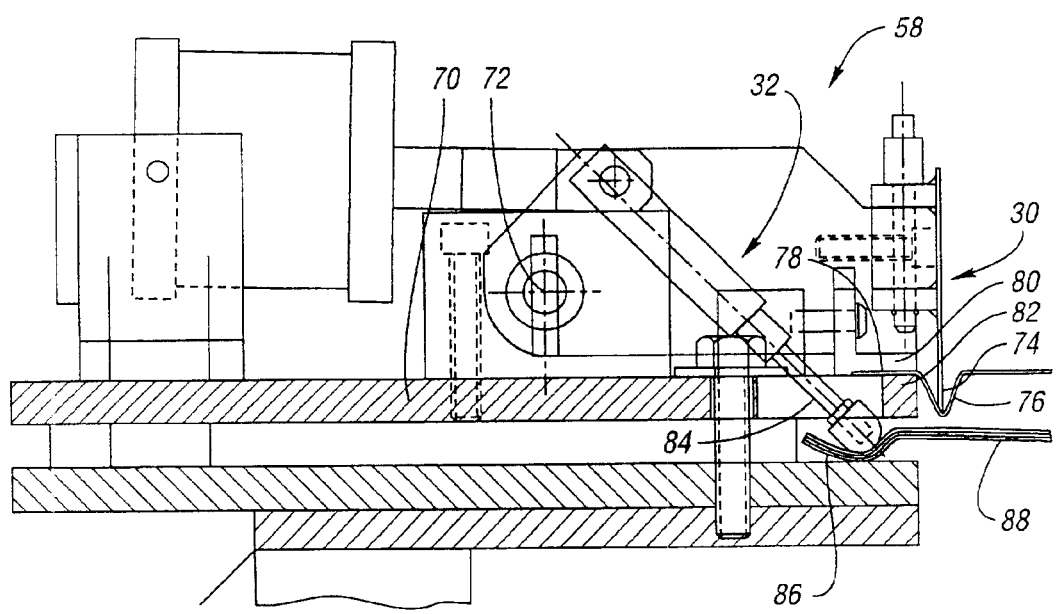
FIG. 8 shows an end view of a substrate and cover material clamped into a shuttle mechanism in accordance with the embodiment of FIG. 6.

Turning to FIG. 8, an end view is shown of upper and lower clamps 30, 32, respectively, of a movable shuttle 58. As shown, the upper clamp is a pivotable jaw clamp pivotally attached to a movable rail 70 at a pivot joint 72. As shown, teeth 74 grab the cover material 76, and a distal edge 78 of the cover material is clamped against a bar 82 by a bracket 80 of the upper clamp 30.

The lower clamp 32 comprises a plurality of pneumatically actuated pin members 84 which selectively engage a distal edge 86 of the substrate 88.

In this clamped position, the movable shuttle 58 shuttles the substrate 88 and cover material 76 into the mold 62. As described previously, as the mold initiates closing, the lower clamping members 32 unclamp so that the substrate 88 lays on the bottom half of the mold, while the upper clamp 30 maintains tension in the cover material 76 to prevent formation of wrinkles in the cover material 76 as the mold closes. After thermoforming, the finished headliner is then transported by another shuttle mechanism into the cooling station 64.

Accordingly, the multiple pneumatically actuated pin members 84 provide the ability to release the substrate 88 prior to release of the cover material 76. The multiple pneumatically actuated pin members 84 also may be individually released at different times with respect to each other if so desired.

While the best mode for carrying out the invention has been described in detail, those familiar with the art to which this invention relates will recognize various alternative designs and embodiments for practicing the invention within the scope of the appended claims.

What is claimed is:

1. A method of forming a headliner for a vehicle, comprising:

overlaying a cover material onto a multi-layer substrate;

at least partially separating the cover material from the substrate during said overlaying step;

clamping the cover material;

clamping the substrate separately from the cover material;

transporting the overlayed cover material and substrate into a mold;

unclamping the substrate while the cover material remains clamped; and molding the cover material and substrate together to form the headliner.

2. The method of claim 1, wherein said step of clamping the cover material comprises using a jaw clamp to hold the cover material, and said step of clamping the substrate comprises using a plurality of discrete clamping members to clamp the substrate.

3. The method of claim 2, wherein each said discrete clamping member comprises a pneumatically actuated pin member.

4. The method of claim 2, wherein said jaw clamp comprises a pivotable structure including a plurality of teeth.

5. The method of claim 2, further comprising selectively unclamping said discrete clamping members at different times.

6. The method of claim 1, wherein clamps used for said clamping steps are movable for said transporting step.

7. The method of claim 1, wherein said step of at least partially separating comprises providing at least one separator plate along an edge of the cover material between the cover material and the substrate.

8. The method of claim 7, wherein said separator plate includes a movable portion to facilitate cutting of the cover material and substrate.

9. The method of claim 1, further comprising unclamping the cover material after unclamping the substrate.

10. The method of claim 1, wherein the substrate comprises multiple layers.

\* \* \* \* \*